Nov. 20, 1928. 1,692,446
K. IMHOFF
HEATABLE SLUDGE DIGESTION CHAMBER FOR SEWAGE TREATMENT
Filed June 18, 1927
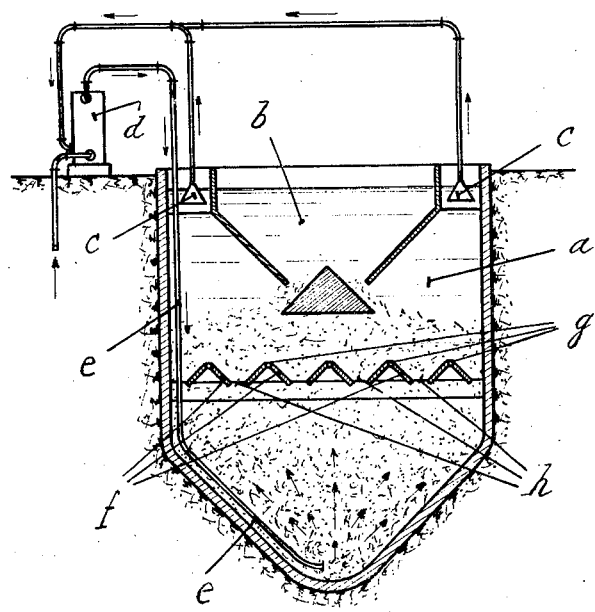
Witnesses:
Inventor:
Karl Imhoff Patented Nov. 20, 1928.

1,692,446

UNITED STATES PATENT OFFICE.

KARL IMHOFF, OF ESSEN, GERMANY.

HEATABLE SLUDGE-DIGESTION CHAMBER FOR SEWAGE TREATMENT.

Application filed June 18, 1927. Serial No. 199,786.

A sludge digestion chamber for sewage treatment filled at its upper part with sewage, cannot be heated only with difficulty because the sludge at the bottom of the chamber becomes by the action of heat lighter and is thus liable to rise whereby it unnecessarily delivers its heat to the sewage above the same. This drawback applies particularly to digestion chambers through which the sewage flows, or to such in hydraulic communication with a settling basin through which latter the sewage flows, for instance a two-storied settling and digestion tank, or so-called Imhoff tank. With these plants, it is in fact impossible in practice to impart to the sludge an essentially higher temperature than to the sewage flowing above the same.

According to the present invention, said drawback is overcome by keeping the main quantity of the sludge down on the bottom of the digestion chamber and preventing rising of the same, with the aid of an intermediary cover which is so constructed that it permits a passage therethrough of the ascending gases in upward direction and of the freshly arriving sinking sludge in downward direction.

The accompanying drawing illustrates diagrammatically by way of example a heatable sludge digestion chamber fitted with the improved intermediary cover, in a vertical cross-section.

The reference letters designate: $a$ the digestion chamber; $b$ the settling basin for the passage of the sewage therethrough and in hydraulic communication with said digestion chamber; and $c$ the gas collectors, the gas being used for heating ordinary water in a boiler $d$. Hence, the hot water is continuously fed through a pipe $e$ to the deepest point in the digestion chamber and delivers its heat to the sludge therein, the excess water taking its way with the other sewage.

The intermediary cover or partition in the sludge digestion chamber is formed of a plurality of angle-shaped slabs or separator members $f$ placed beside each other and having small apertures $g$ in their tops for allowing passage of the gases therethrough and larger apertures $h$ between their bottoms for allowing a sinking of the freshly arriving sludge, and also a passage of the gases, therethrough. These members $f$ have their ridges presented to the top of the tank and the openings $g$ are located in said ridges.

What I claim, is:—

1. The combination in a sludge digestion chamber, of means for heating the latter at its deepest point, and a partition between the top and bottom of the tank separating the heated lower part of the chamber from the upper part thereof, said partition comprising separator members placed side by side and spaced apart along their lateral edges, each of said members having openings therethrough.

2. The combination of a sludge digestion chamber, of means for heating the latter at its deepest point, and a partition between the top and bottom of the chamber, said partition comprising angle-shaped separator members with their ridges presented to the top of the tank, said members being spaced apart along their edges and having openings in the upper part of these members.

In testimony whereof I have hereunto set my hand.

KARL IMHOFF.